United States Patent
Long et al.

(10) Patent No.: US 8,809,216 B2
(45) Date of Patent: Aug. 19, 2014

(54) CATALYST FOR CONVERTING ACID-CONTAINING INFERIOR CRUDE OIL AND PROCESS FOR MAKING AND USING THE SAME

(75) Inventors: Jun Long, Beijing (CN); Jiushun Zhang, Beijing (CN); Huiping Tian, Beijing (CN); Yuxia Zhu, Beijing (CN)

(73) Assignees: China Petroleum & Chemical Corporation, Beijing (CN); Research Institute of Petroleum Processing, Sinopec, Beijing (CN)

( * ) Notice: Subject to any disclaimer, the term of this patent is extended or adjusted under 35 U.S.C. 154(b) by 847 days.

(21) Appl. No.: 12/812,148

(22) PCT Filed: Jan. 9, 2009

(86) PCT No.: PCT/CN2009/000032
§ 371 (c)(1),
(2), (4) Date: Jul. 8, 2010

(87) PCT Pub. No.: WO2009/092282
PCT Pub. Date: Jul. 30, 2009

(65) Prior Publication Data
US 2010/0288675 A1 Nov. 18, 2010

(30) Foreign Application Priority Data

Jan. 9, 2008 (CN) .......................... 2008 1 0055793
May 20, 2008 (CN) .......................... 2008 1 0112001

(51) Int. Cl.
*B01J 29/06* (2006.01)
*C10G 11/05* (2006.01)

(52) U.S. Cl.
USPC ............... 502/60; 502/63; 502/64; 502/68; 502/69; 502/77; 502/78; 502/79; 208/120.01; 208/121; 208/120.15

(58) Field of Classification Search
USPC ........... 502/60, 63, 64, 68, 69, 71, 77, 78, 79; 208/120.01, 120.15, 121
See application file for complete search history.

(56) References Cited

U.S. PATENT DOCUMENTS

| | | | |
|---|---|---|---|
| 4,994,254 A | * | 2/1991 | Suzuki et al. ................ 423/713 |
| 5,891,325 A | | 4/1999 | Bearden et al. |
| 6,211,104 B1 | * | 4/2001 | Shi et al. .......................... 502/67 |
| 6,346,224 B1 | * | 2/2002 | Vitale-Rojas et al. ...... 423/328.2 |

FOREIGN PATENT DOCUMENTS

| | | | |
|---|---|---|---|
| CN | 1504540 A | | 6/2004 |
| CN | 1552805 A | | 12/2004 |
| CN | 1827744 A | | 9/2006 |
| CN | 1978593 | * | 6/2007 |
| EP | 0313167 A1 | | 4/1989 |
| WO | 2004/020093 A1 | | 3/2004 |

OTHER PUBLICATIONS

International Search Report dated Apr. 23, 2009, issued in corresponding International Application No. PCT/CN2009/000032.

* cited by examiner

*Primary Examiner* — Elizabeth Wood
(74) *Attorney, Agent, or Firm* — Scully, Scott, Murphy & Presser, P.C.

(57) ABSTRACT

The present invention relates to a catalyst for converting inferior acid-containing crude oil. Based on the total amount of the catalyst, said catalyst comprises from 1 to 50 wt % of a mesopore material, from 1 to 60 wt % of molecular sieves and from 5 to 98 wt % of thermotolerant inorganic oxides and from 0 to 70 wt % of clays. Said mesopore material is an amorphous material containing alkaline earth oxide, silica and alumina, and has an anhydrous chemical formula of $(0\text{-}0.3)Na_2O \cdot (1\text{-}50)MO \cdot (6\text{-}58)Al_2O_3 \cdot (40\text{-}92)SiO_2$, based on the weight percent of the oxides, wherein M is one or more selected from Mg, Ca and Ba. Said mesopore material has a specific surface area of 200-400 m²/g, a pore volume of 0.5-2.0 ml/g, an average pore diameter of 8-20 nm, and a most probable pore size of 5-15 nm. The catalyst provided in the present invention is suitable for the catalytic conversion of crude oil having a total acid number of greater than 0.5 mgKOH/g and for the removal of organic acids, carbon residues and metals in crude oil, and thus has very good economic benefits.

17 Claims, No Drawings

CATALYST FOR CONVERTING ACID-CONTAINING INFERIOR CRUDE OIL AND PROCESS FOR MAKING AND USING THE SAME

TECHNICAL FIELD

The present invention relates to a catalytic material for converting hydrocarbon oil and a process for preparing the same, as well as the application of the catalyst prepared from such catalytic material in the catalytic conversion of inferior acid-containing crude oil. More specifically, the present invention relates to a catalytic material for catalytically converting inferior acid-containing crude oil in the absence of hydrogen and a process for preparing the same.

BACKGROUND OF THE INVENTION

With the increasing requirements on crude oil, crude oil is continuously explored; light crude oil resource gradually decreases and the ratio of heavy and inferior acid-containing crude oil is increasing. The quality of the world crude oil generally tends to become heavy and inferior, and the output of crude oil having high sulfur content, high total acid number, high metal content and high carbon residue is rapidly increased. It is predicted that the world output of inferior acid-containing crude oil will be increased from currently 16% to 20% in 2010. Based on this background, to process inferior acid-containing crude oil with the catalytically cracking apparatus is the problem which we have to confront.

Inferior acid-containing crude oil has low hydrogen content, high content of metals, such as Ni, V and the like, high content of condensed aromatics, high content of S and N, high density and high conradson carbon number, so that it is difficult to crack said crude oil. Since it is difficult to crack the inferior acid-containing crude oil, the catalytic cracking equipment for processing such crude oil is forced to throw off a great quantity of slurry, with the result that the total yield of liquid products (liquefied gas, gasoline, diesel oil) decreases. Higher Ni and V content renders that hydrogen content in the products are greatly increased, which has strong destruction on the catalyst. In order to maintain the balance activity of the catalyst, the unit consumption of the catalyst will be certainly increased. Moreover, the addition of the metal deactivator is also difficult to achieve the desirable effect. Thus it is advisable that such inferior acid-containing crude oil should be upgraded or pretreated before processing, so as to increase the hydrogen/carbon ratio of the crude oil and reduce the metal content and conradson carbon number.

In order to improve the properties of crude oil and to reduce the conradson carbon number and metal content, a non-catalytic pretreating process comprises introducing crude oil having a substantial conradson carbon number and metals content into the demetallization and decarbonizing zone of the fluidized catalytic cracking apparatus to come into contact with an inert fluidizable solid particles. Under the conditions of at least 480° C. and less than 2 s of the contact time, high boiling components of the crude oil and metals are deposited on the inert fluidizable solid particles. These particles are recycled into a burning zone to remove combustible deposit. Inert particles from which combustible deposit is burned away are recycled into demetallization and decarbonizing zone to come into contact with crude oil again. Said crude oil treated with such process can be used as the feedstock of FCC.

Recently, the process of inferior acid-containing crude oil is gradually drawing increasing attention. The amount of highly acidic crude oil in the international market is gradually increased. In 2005, the world output of highly acidic crude oil occupied 5.5% of the total output of crude oil. Acidic substances in crude oil are inorganic acids, phenols, mercaptans, aliphatic carboxylic acids, naphthenic acids and the like, wherein naphthenic acids are the uppermost acidic oxides in crude oxide and occupy about 90 wt % of acidic oxides. Studies show that crude oil having a total acid number of 0.5 mgKOH/g will result in significant corrosion of the refining equipments. Thus crude oil having a total acid number of greater than 0.5 mgKOH/g is called as highly acidic crude oil. During the processing of crude oil, naphthenic acids in crude oil may directly react with iron, thereby causing corrosion of furnace tube, heat exchanger and other refining equipments. In addition, naphthenic acids may react with the protective film FeS on the petrolatum equipments to enable the metal equipment to expose new surface and to be subjected to new corrosion. For general petroleum products, such as gasoline, diesel oil and kerosene, there are always the requirements on the acid number in the quality indexes thereof. Overhigh acid number will bring the same corrosion problem to the final customers.

The processes introduced in the documents and patents further include the physical adsorption process, the thermal treatment, the thermal cracking process and the catalytic hydrogenation process. These processes, however, are not applied in the practical application.

Physical adsorption process—In the presence of an adsorbent, acid-containing crude oil or fraction is thermally treated at 250-350° C. to adsorb and transfer acid-containing compounds in crude oil, wherein the adsorbent may be a waste catalytically cracking catalyst. Alternatively, the blend of crude oil and alkaline earth metal oxides is heated at 100-300° C. to enable said alkaline earth metal oxides to react with organic acids or sulfides in crude oil, so as to produce the precipitates of alkaline earth metal carbonates and alkaline earth metal sulfides. After separation, crude oil from which naphthenic acids and sulfides are removed is obtained.

Catalytic hydrogenation process—Under the conditions of a hydrogen partial pressure of 2-3 Mpa and a reaction temperature of 250° C., acid-containing crude oil is hydrotreated by using Ni—Mo or Ni—Co hydrorefining catalyst in which the carrier is alumina, so as to decompose naphthenic acids to $CO$, $CO_2$, $H_2O$ and petroleum hydrocarbons having a low molecular weight, and to reduce the total acid number of crude oil from 2.6 mgKOH/g to 0.15 mgKOH/g. Although catalytic hydrogenation process has a better deacidification effect, it needs a high pressure-resistant and high temperature-resistant apparatus, and hydrogen gas. Said apparatus thus requires a high apparatus investment and a large technological investment. In the absence of hydrogen gas, highly acidic crude oil can be treated with Ni—Mo or Ni—CO hydrorefining catalyst at 285-345° C., so as to reduce the total acid number of crude oil from 4.0 mgKOH/g to 1.8 mgKOH/g.

Thermal treatment and thermal cracking process (including catalytically thermal cracking)—U.S. Pat. No. 5,891,325 discloses a process for reducing total acid number of crude oil by a multistage thermal reaction. The thermal reaction in said process comprises a plurality of stages, wherein each stage of the thermal reaction decomposes at a certain temperature and pressure a portion of petroleum acids, and produces volatile organic acids, petroleum hydrocarbons and non-volatile petroleum hydrocarbons. While the reaction is carried out, said process further comprises sweeping the reaction system with an inert gas, collecting volatile components, neutralizing most of organic acids with a basic salt of a Group HA metal, such as $CaO$, $Ca(OH)_2$, $CaCO_3$, $MgO$ and the like, to produce volatile petroleum hydrocarbons. Then said volatile petroleum hydrocarbons and non-volatile petroleum hydrocarbons are blended together to obtain crude oil from which the petroleum acids are removed.

CN1827744A discloses a method for processing crude oil with high total acid number, comprising preheating said crude oil which has a total acid number of more than 0.5 mgKOH/g after the pretreatment and injecting them into the fluidized catalytic cracker to contact the catalyst, and reacting in catalytically cracked reaction condition, naphthenic acid in said crude oil being cracked to be hydrocarbons and $CO_2$, separating the reacted oil gas and the catalyst, in which the oil gas is fed into the subsequent separation system, while the reacted catalyst can be circularly used after stripping and regenerating.

At present, inferior acid-containing crude oil is generally processed by mixing with low acid crude oil. Generally, the total acid number of the mixed crude oil is required to be not more than 0.5 mgKOH/g, so that the blending ratio of acid-containing crude oil is limited to some extent. The higher the total acid number, density and carbon residue of acid-containing crude oil are, the more difficult the processing thereof is.

CONTENTS OF THE INVENTION

The object of the present invention is to provide a catalyst capable of catalytically cracking directly inferior acid-containing crude oil, particularly crude oil having a total acid number of greater than 0.5 mgKOH/g so as to produce high added-value products, a process for preparing said catalyst, and a process for converting said crude oil by using said catalyst.

The catalyst for converting inferior acid-containing crude oil in the present invention comprises from 1 to 50 wt % of a mesopore material, from 1 to 60 wt % of molecular sieves, from 5 to 98 wt % of thermotolerant inorganic oxides and from 0 to 70 wt % of clays, based on the total amount of the catalyst. Preferably, said catalyst comprises from 5 to 40 wt % of a mesopore material, from 10 to 50 wt % of molecular sieves, from 10 to 70 wt % of thermotolerant inorganic oxides and from 0 to 60 wt % of clays, based on the total amount of the catalyst. More preferably, said catalyst comprises from 10 to 40 wt % of a mesopore material and from 20 to 40 wt % of molecular sieves, based on the total amount of the catalyst.

The catalyst used in the present invention comprises the mesopore material, wherein said mesopore material is an amorphous material containing alkaline earth oxide, silica and alumina, and has an anhydrous chemical formula of $(0-0.3)Na_2O \cdot (1-50)MO \cdot (6-58)Al_2O_3 \cdot (40-92)SiO_2$, based on the weight percent of the oxides. Preferably, said mesopore material has an anhydrous chemical formula of $(0-0.2)Na_2O \cdot (2-30)MO \cdot (6-35)Al_2O_3 \cdot (60-92)SiO_2$, based on the weight percent of the oxides. M is one or more selected from Mg, Ca and Ba, preferably Mg and/or Ca. The mesopore material has a specific surface area of 200-400 $m^2/g$, a pore volume of 0.5-2.0 ml/g, preferably 1.0-2.0 ml/g, an average pore diameter of 8-20 nm, preferably 10-20 nm, and a most probable pore size of 5-15 nm, preferably 10-15 nm.

Preferably, said mesopore material in an anhydrous form comprises from 0.1 to 0.2 wt % of $Na_2O$, from 60 to 85 wt % of $SiO_2$ and from 6 to 20 wt % of $Al_2O_3$, based on the weight percent of the oxides. Preferably, said mesopore material in an anhydrous form comprises from 5 to 30 wt % of MO, based on the weight percent of the oxides.

Said molecular sieves are one or the mixture of more selected from the group consisting of faujasite, Beta zeolite, molecular sieves having MFI structure and mordenite. Said thermotolerant inorganic oxide is one or the mixture of more selected from the group consisting of alumina, silica and amorphous silica-alumina Said clay is one or the mixture of more selected from kaolin, halloysite, montmorillonite, diatomite, endellite, saponite, rectorite, sepiolite, attapulgite, hydrotalcite and bentonite.

The process for manufacturing the mesopore material provided in the present invention comprises neutralizing aluminium source, silica source and alkaline earth solution at a temperature ranging from room temperature to 85° C. to form a gel, adjusting the final pH of the gel to 7-9 using acids or alkalies, aging for 1-10 h at a temperature ranging from room temperature to 90° C., removing impurity ions by ammonium exchange of the resulted solid precipitates to obtain an ammonium-exchanged gel, or further drying and calcining. In the process for preparing the mesopore material provided in the present invention, said aluminium source is one or more selected from the group consisting of aluminium nitrate, aluminium sulfate, aluminum chloride and sodium aluminate; said silica source is one or more selected from the group consisting of water glass, sodium silicate, silicon tetraethyl and silica; said acid is one or more selected from the group consisting of sulfuric acid, hydrochloric acid and nitric acid; and said alkali is one or more selected from the group consisting of ammonia water, potassium hydroxide and sodium hydroxide.

The process for preparing the catalyst provided in the present invention comprises mixing and slurrying all or a portion of thermotolerant inorganic oxides and/or the precursor thereof and water, adding or not adding clays, adding the mesopore material, adding the molecular sieves, drying the obtained slurry and calcining; wherein an acid is added before adding the mesopore material, before or after adding the clays, to adjust the pH of the slurry to 1-5, and the slurry is aged at a temperature of 30-90° C. for 0.1-10 h, adding the residual thermotolerant inorganic oxides and/or the precursor thereof after aging step; said mesopore material is the amorphous material containing alkaline earth oxide, silica and alumina mentioned above, wherein each component has an optional content as mentioned before for the mesopore material. Due to the amount of each component, the final catalyst comprises from 1 to 50 wt % of the mesopore material, from 1 to 60 wt % of the molecular sieves, from 5 to 98 wt % of the thermotolerant inorganic oxides and from 0 to 70 wt % of the clays, based on the total amount of the catalyst. Preferably, said catalyst comprises from 5 to 40 wt % of the mesopore material, from 10 to 50 wt % of the molecular sieves, from 10 to 70 wt % of the thermotolerant inorganic oxides and from 0 to 60 wt % of the clays, based on the total amount of the catalyst. More preferably, said catalyst comprises from 10-40 wt % of the mesopore material and from 20 to 40 wt % of the molecular sieves, based on the total amount of the catalyst.

The beneficial effects of the catalyst and the process for preparing the same are reflected as follows.

The catalyst provided in the present invention contains a mesopore material containing alkaline earth oxide, silica and alumina, having a specific surface area of 200-400 $m^2/g$, a pore volume of 0.5-2.0 ml/g, and an average pore diameter of 8-20 nm. The presence of alkaline earth oxide is advantageous to promoting the catalytic decomposition of organic acids in inferior acid-containing crude oil. Meanwhile, high specific surface area, great pore volume and mesopore diameter are in favor of the entry and adsorption of heavy-metal chelate complex and resin in inferior acid-containing crude oil, and of the reduction of the deactivation of the catalyst active center resulted by the deposition of heavy metals and coke. Thus the catalyst provided in the present invention can be directly used to catalytically crack inferior acid-containing crude oil to produce high added-value products. At the same time, the acid number or acidity of the reaction products, such as gasoline, diesel oil and the like, satisfies the product requirements without the necessity of refining the products due to high acid number or acidity.

The process for catalytically converting inferior acid-containing crude oil provided in the present invention comprises pretreating and preheating said crude oil, introducing into the fluidized catalytic cracker, contacting with the catalyst above and reacting under the catalytically cracking reaction conditions, separating the reacted oil and gas and the coked catalyst, wherein the reacted gas and oil is fed into the subsequent separation system; and the catalyst is recycled after stripping and regenerating; the components of said catalyst and the content thereof are described as above. Said mesopore material is an amorphous material containing alkaline earth metal oxide, silica and alumina, wherein the optional content of each component is described as stated above for the mesopore material.

The beneficial effects of the process for catalytically converting crude oil provided in the present invention are reflected as follows.

The catalyst used in the process provided in the present invention contains a mesopore material containing alkaline earth oxide, silica and alumina, having a specific surface area of 200-400 $m^2/g$, a pore volume of 0.5-2.0 ml/g, an average pore diameter of 8-20 nm. The presence of alkaline earth oxide is advantageous to promoting the catalytic decomposition of organic acid in inferior acid-containing crude oil. Meanwhile, high specific surface area, great pore volume and mesopore diameter are in favor of the entry and adsorption of heavy-metal chelate complex and resin in inferior acid-containing crude oil, and of the reduction of the deactivation of the catalyst active center resulted by the deposition of heavy metals and coke. Thus the process provided in the present invention can be directly used to catalytically crack inferior acid-containing crude oil to produce high added-value clean gasoline and light olefin products.

MODE OF CARRYING OUT THE INVENTION

The catalyst provided in the present invention comprises from 1 to 50 wt % of a mesopore material, from 1 to 60 wt % of molecular sieves, from 5 to 98 wt % of thermotolerant inorganic oxides and from 0 to 70 wt % of clays, based on the total amount of the catalyst. Preferably, said catalyst comprises from 5 to 40 wt % of a mesopore material, from 10 to 50 wt % of molecular sieves, from 10 to 70 wt % of thermotolerant inorganic oxides and from 0 to 60 wt % of clays, based on the total amount of the catalyst. More preferably, said catalyst comprises from 10 to 40 wt % of a mesopore material and from 20 to 40 wt % of molecular sieves, based on the total amount of the catalyst.

The mesopore material is an amorphous material containing alkaline earth metal oxide, silica and alumina, having an anhydrous chemical formula of, based on the weight percent of the oxides, $(0-0.3)Na_2O.(1-50)MO.(6-58)Al_2O_3.(40-92)SiO_2$, preferably $(0-0.2)Na_2O.(2-30)MO.(6-35)Al_2O_3.(60-92)SiO_2$. Preferably, said anhydrous mesopore material comprises from 0.1 to 0.2 wt % of $Na_2O$, from 60 to 85 wt % of $SiO_2$ and from 6 to 20 wt % of $Al_2O_3$, based on the weight percent of the oxides. Preferably, said anhydrous mesopore material comprises from 5 to 30 wt % of MO, based on the weight percent of the oxides.

Said alkaline earth metal M is one or more selected from Mg, Ca and Ba, preferably Mg and/or Ca.

In the catalyst provided in the present invention, said molecular sieve is one or the mixture of more selected from the group consisting of macropore molecular sieves and mesopore molecular sieves generally used as the active component of the cracking catalyst, such as one or the mixture of more selected from faujasite, Beta zeolite, molecular sieves having MFI structure and mordenite.

Said faujasite is one or the mixture of more selected from the group consisting of HY, REY, REHY, USY, REUSY, DASY, DOSY and REDASY, wherein the rare earth content of REY, REHY, REUSY, REDASY, and DOSY (based on $RE_2O_3$) ranges from 0.5 to 20 wt %.

Furthermore, said faujasite is one or the mixture of more selected from the group consisting of HY, REY, REHY, USY, REUSY, DASY, DOSY and REDASY modified with one or more elements selected from the group consisting of Ba, Ca, Fe, Mg, P, Sr, Sn, Sb, Ti, Zn and Zr, wherein the rare earth content of REY, REHY, REUSY, REDASY, and DOSY (based on $RE_2O_3$) ranges from 0.5 to 20 wt %.

Said molecular sieve having MFI structure is one or the mixture of more selected from the group consisting of molecular sieves of ZSM-5 and ZRP series.

Furthermore, said molecular sieve having MFI structure is one or the mixture of more selected from the group consisting of molecular sieves of ZSM-5 and ZRP series modified with one of more elements selected from the group consisting of RE, P, Fe, Co, Ni, Cu, Zn, Mo, Mn, Ga and Sn.

Said Beta zeolite is a Beta zeolite modified with one of more elements selected from the group consisting of RE, P, Fe, Co, Ni, Cu, Mn, Zn, and Sn.

In the catalyst provided in the present invention, said thermotolerant inorganic oxide is one or more thermotolerant inorganic oxides as matrix and binder component of cracking catalyst, such as one or more selected from the group consisting of alumina, silica and amorphous silica-alumina. These thermotolerant inorganic oxides are well known by those skilled in the art.

Said clay is one or the mixture of more selected from the clays as active components of the cracking catalyst, such as kaolin, halloysite, montmorillonite, diatomite, endellite, saponite, rectorite, sepiolite, attapulgite, hydrotalcite and bentonite, preferably one or the mixture of more selected from kaolin, halloysite and montmorillonite. These clays are well known by those skilled in the art.

In the process for preparing the catalyst provided in the present invention, all or a portion of thermotolerant inorganic oxides and/or the precursor thereof may be added before aging step. In order to make the catalyst have better attrition resistance ability, a portion of thermotolerant inorganic oxides and/or the precursor thereof may be added preferably before aging step, and the residual thermotolerant inorganic oxides and/or the precursor thereof are/is added after aging step, wherein the portion added firstly and the portion added later enables the weight ratio of the thermotolerant inorganic oxides added firstly and the thermotolerant inorganic oxides added later to be 1:0.1-10 in catalyst, preferably 1:0.1-5.

In the process for preparing the catalyst provided in the present invention, said clay may be added before or after aging step. The order of adding said clay has no effect on the performance of the catalyst.

In the process for preparing the catalyst provided in the present invention, an acid is further added before adding the mesopore material, before or after adding the clays, to adjust the pH of the slurry to 1-5. Then the slurry is aged at a temperature of 30-90° C. for 0.1-10 h. Said acid is one or more selected from the group consisting of soluble inorganic acids and organic acids, preferably one or the mixture of more selected from the group consisting of hydrochloric acid, nitric acid, phosphoric acid and carboxylic acid having a carbon molecule number of 1-10. The amount of the acid enables the pH of the slurry to range from 1-5, preferably 1.5-4.

Said aging temperature ranges from 30 to 90° C., preferably from 40 to 80° C. Aging lasts from 0.1 to 10 h, preferably 0.5 to 8 h.

In the process for preparing the catalyst provided in the present invention, the precursor of said thermotolerant inorganic oxide represents one or more substances capable of forming said thermotolerant inorganic oxide during the preparation of the catalyst. For example, the precursor of alumina may be selected from hydrated alumina and/or alumina sol, wherein said hydrated alumina is one or more selected from the group consisting of boehmite, pseudo-boehmite, aluminum trihydrate and amorphous aluminium hydroxide. The precursor of silica may be one or more selected from the group consisting of silica sol, silica gel and water glass. The precursor of amorphous silica-alumina may be one or more selected from the group consisting of silica-alumina sol, mixture of silica sol and alumina sol, and silica-alumina gel. The precursors of these thermotolerant inorganic oxides are well known by those skilled in the art.

Due to the amount of each component, the final catalyst in the process for preparing the catalyst provided in the present invention comprises 1-50 wt % of the mesopore material, 1-60 wt % of the molecular sieves, 5-98 wt % of the thermotolerant inorganic oxides and 0-70 wt % of the clays, based on the total amount of the catalyst. Preferably, the final catalyst in the process for preparing the catalyst provided in the present invention comprises 5-40 wt % of the mesopore material, 10-50 wt % of the molecular sieves, and 10-70 wt % of the thermotolerant inorganic oxides and 0-60 wt % of the clays, based on the total amount of the catalyst. More preferably, the final catalyst in the process for preparing the catalyst provided in the present invention comprises 10-40 wt % of the mesopore material and 20-40 wt % of the molecular sieves.

In the process for preparing the catalyst of the present invention, the methods and conditions for drying the slurry are well known by those skilled in the art. For example, drying may be air drying, baking, forced air drying or spray drying, preferably spray drying. The drying temperature may range from room temperature to 400° C., preferably from 100 to 350° C. In order to be convenient for spray drying, the solid content of the slurry before drying is preferably 10-50 wt %, more preferably 20-50 wt %.

The calcining conditions after drying said slurry are also well known by those skilled in the art. Generally, the calcining temperature after drying said slurry ranges from 400 to 700° C., preferably from 450 to 650° C.; the calcination lasts at least 0.5 h, preferably from 0.5 to 100 h, more preferably from 0.5 to 10 h.

In the process for preparing the catalyst provided in the present invention, the process for manufacturing the mesopore material of the present invention comprises neutralizing aluminium source, silica source and alkaline earth solution at a temperature ranging from room temperature to 85° C. to form a gel, adjusting the final pH of the gel to 7-9 using acids or alkalies, aging for 1-10 h at a temperature ranging from room temperature to 90° C., removing impurity ions by ammonium exchange of the resulted solid precipitates to obtain an ammonium-exchanged gel, or further drying and calcining Said aluminium source is one or the mixture of more selected from the group consisting of aluminium nitrate, aluminium sulfate, aluminum chloride and sodium aluminate; said silica source is one or the mixture of more selected from the group consisting of water glass, sodium silicate, silicon tetraethyl and silica; said acid is one or the mixture of more selected from the group consisting of sulfuric acid, hydrochloric acid and nitric acid; and said alkali is one or the mixture of more selected from the group consisting of ammonia water, potassium hydroxide and sodium hydroxide According to the weight ratio of precipitate (dry basis): ammonium salt:$H_2O$=1:(0.1-1):(10-30), said ammonium exchange used therein comprises exchanging the aged solid precipitates at a temperature ranging from room temperature to 100° C. with one to three times, each for 0.3-1 h until the sodium content in the precipitates (dry basis) is lower than 0.2 wt % Ammonium salt used in the exchange is any one selected from the group consisting of ammonium chloride, ammonium nitrate, ammonium carbonate and ammonium bicarbonate.

Said mesopore material may be added in a gel form during the preparation of the catalyst, or in the form of a dried or calcined solid. Moreover, the adding manner of said mesopore material has no effect on the performance of the catalyst.

In the process for catalytically converting inferior acid-containing crude oil provided in the present application, the catalytic conversion catalyst as stated above is used. Said process comprises the following steps of pretreating and preheating said crude oil, introducing into the catalytic cracker, contacting with the catalyst and reacting under the catalytically cracking reaction conditions, separating the reacted oil and gas and the coked catalyst, wherein the reacted gas and oil is fed into the subsequent separation system; and the catalyst is recycled after stripping and regenerating.

In said conversion process, said catalytic cracking reaction is conducted at a reaction temperature of 450-650° C., a reaction pressure of 0.1-0.8 Mpa, a weight hourly space velocity of 5-25 $h^{-1}$, and a weight ratio of 1-30 of the catalyst to said crude oil. Preferably, said catalytic cracking is conducted at a reaction temperature of 480-600° C., an absolute pressure of 0.1-0.5 Mpa in the reaction region, a space velocity of 10-20 $h^{-1}$, and a weight ratio of 3-15 of the catalyst to said crude oil.

In the process provided in the present invention, the preferred solution comprises preheating said pretreated crude oil to 100-280° C., feeding into the catalytic cracker to come into contact with said catalyst and reacting under the catalytically cracking reaction conditions.

Said pretreatment above means:

When said feedstock is acid-containing crude oil, the metals having poisoning effect against the catalytically cracking catalyst in highly acidic crude oil and water having adverse effects on the operation of the catalytically cracking apparatus are partially removed from highly acidic crude oil by the electric desalting process. The desalted crude oil is heated and fed into the catalytic cracker to come into contact with and react with the regenerated catalyst.

In the process provided in the present invention, said electric desalting of crude oil is the well known process for those professionally skilled in the art. The general operating method comprises mixing water satisfying the requirements on electric desalting with a demulsifying agent and/or a demetalization agent and heating, then mixing with the heated highly acidic crude oil. The mixed stream is fed into the first-stage desalter for electric desalting, so as to separate water and oil. The separated oil is then mixed with water containing a demulsifying agent and/or a demetalization agent and heated via a heat exchanger, and then fed into the second-stage desalter. Water and desalted crude oil are separated from the second-stage desalter.

In the process provided in the present invention, said crude oil has a total acid number of greater than 0.5 mgKOH/g, a total content of heavy metals nickel and vanadium of greater than 10 ppm, a sulfur content of greater than 1000 ppm, and a conradson carbon number of greater than 3 wt %.

The characteristic factor K value is the function of the average boiling point and relative density of the oil product. The specific functional relation is stated as follows: $K=(1.216T^{1/3})/d_{15.6}^{15.6}$, wherein T is the absolute temperature of the average boiling point of the oil product, and d is the relative density of the oil product. Alkanes have the greatest K value of about 12.7; the K value of naphthenes, which is 11-12, takes the second place; and aromatics have the minimum K value of 10-11. Thus the characteristic factor K value can represent the chemical properties of oil products.

In acid-containing crude oil, paraffin-base crude oil generally contains more than 50 wt % of alkanes, and is characterized in smaller density, higher wax content, lower sulfur and resin content, and a characteristic factor K value of more than 12.0. Naphthene-base crude oil is characterized in higher naphthene and aromatic content, lower pour point, generally higher sulfur, resin and asphaltene content, and a characteristic factor K value of less than 11.5. The properties of intermediate-base crude oil lie there between, and the characteristic factor K value thereof ranges from 11.5 to 12.0.

With regard to crude oil having different properties, two processing methods are preferred. For crude oil having a total acid number of greater than 0.5 mgKOH/g and a characteristic factor K value of less than 12.5, said processing method comprises preheating said pretreated crude oil, and introducing into the catalytic cracker, contacting with the catalyst according to any one of claims 1-7 and reacting under the catalytically cracking reaction conditions, separating the reacted oil and gas and the coked catalyst, wherein the reacted gas and oil is fed into the separation system to produce the products having different distillation ranges, and all or a portion of diesel oil are introduced back to the reaction system for further reaction; and the catalyst is recycled after stripping and regenerating.

For crude oil having a total acid number of greater than 0.5 mgKOH/g and a characteristic factor K value of greater than 12.1, said processing method comprises preheating said pretreated crude oil, and introducing into the catalytic cracker, contacting with the catalyst and reacting under the catalytically cracking reaction conditions, separating the reacted oil and gas and the coked catalyst, wherein the reacted gas and oil is fed into the separation system to produce the products having different distillation ranges; and the catalyst is recycled after stripping and regenerating; the molecular sieves in said catalyst comprise Y-type molecular sieves, molecular sieves having MFI structure and optionally Beta molecular sieves, wherein said Y-type molecular sieves are in an amount of 10-80 wt %; said molecular sieves having MFI structure are in an amount of 10-90 wt %, and said Beta molecular sieves are in an amount of 0-25 wt %, based on the total amount of the molecular sieves In the process for converting crude oil provided in the present invention, said catalytic cracker is one or the combination of more selected from the group consisting of the fluidized bed reactor, the riser reactor, the cocurrent downflow conveying line reactor and the moving bed reactor. Said riser reactor is one or more selected from the group consisting of the equal diameter riser reactor, the equal linear speed riser reactor and the variable diameter riser reactor. Said fluidized bed reactor is one or more selected from the group consisting of the fixed fluidized bed reactor, the particulate fluidized bed reactor, the fixed bed bubble reactor, the turbulent bed reactor, the fast fluidized bed reactor, the transport fluidized bed reactor and the dense phase fluidized bed.

The catalyst and the process for converting crude oil provided in the present invention is suitable for catalytically cracking directly inferior acid-containing crude oil having a total acid number of greater than 0.5 mgKOH/g and a conradson carbon number of greater than 3 wt % or the liquid fractions thereof to produce high added-value products. Meanwhile, the acid number or acidity of the reaction products, such as gasoline, diesel oil and the like, satisfies the product requirements without the necessity of refining the products due to high acid number or acidity. Preferably, crude oil having a total acid number of greater than 1 mgKOH/g, a conradson carbon number of greater than 5 wt %, a Ni content of greater than 10 ppm, a Fe content of greater than 10 ppm and a Ca content of greater than 10 ppm can be directly treated with the catalyst provided in the present invention, which has very good economic benefits.

The following examples are provided to further explain the present invention, but not to limit the present invention thereby. The anhydrous chemical formula of the mesopore material is obtained by the determination of the element composition thereof using X-ray fluorescent spectrometry and then the conversion.

EXAMPLES

The materials used in the examples and comparative examples are as follows:
hydrochloric acid from Beijing Chemical Works, chemically pure, having a concentration of 36-38 wt %;
sodium water glass commercially available, containing 26.0 wt % of $SiO_2$ and having a module of 3.2;
halloysite from Suzhou Kaolin Company, having a solid content of 74.0 wt %;
pseudo-boehmite, an industrial product from Shandong Aluminium Plant, having a solid content of 62.0 wt %;
alumina sol, a product from Sinopec Catalyst Company Qilu Division, containing 21.5 wt % of $Al_2O_3$;
DASY molecular sieve (having a solid content of 92.0 wt %), ZSP-2 molecular sieve (having a solid content of 97.8 wt %), REHY molecular sieve (having a solid content of 88.0 wt %), Beta molecular sieve (having a solid content of 95.2 wt %), DOSY molecular sieve (having a solid content of 93.5 wt %) from Sinopec Catalyst Company Qilu Division.

Example 1

This example shows the mesopore material in the catalyst provided in the present invention, as well as the process for preparing the same.

1750 g of water glass solution having a concentration of 4 wt % (based on $SiO_2$) was added to a beaker. Under the stirring condition, 350 g of sodium aluminate solution having a concentration of 4 wt % (based on $Al_2O_3$), 150 g of aluminium sulfate solution having a concentration of 4 wt % (based on $Al_2O_3$), and 250 g of calcium chloride solution having a concentration of 4 wt % (based on CaO) were added to the aforesaid water glass solution at the same time, and then heated to 80° C. and aged for 4 h Ammonium ion exchange was conducted to obtain a mesopore material in a gel state, which was abbreviated to be N1.

Ammonium ion exchange: according to the weight ratio of precipitate (dry basis): ammonium salt:$H_2O$=1:0.8:15, ammonium ion exchange of the precipitates was conducted with NH$_4$Cl solution twice at 60° C. each for 0.5 h to remove sodium ions therein. After each exchange, washing filtration was conducted.

N1 was then dried at 120° C. for 15 h, and calcined at 600° C. for 3 h to obtain the mesopore material, which was abbreviated to be G1. The element analysis weight chemical formula of such sample is 0.2Na$_2$O.9.8CaO.19.8Al$_2$O$_3$.70.2SiO$_2$, and the physicochemical parameters thereof, such as specific surface, pore volume and the like, are listed in Table 1.

Example 2

This example shows the mesopore material in the catalyst provided in the present invention, as well as the process for preparing the same.

125 g of calcium chloride solution having a concentration of 4 wt % (based on CaO) was added to 400 g of aluminium sulfate solution having a concentration of 2.5 wt % (based on Al$_2$O$_3$). Under the stirring condition, the aforesaid mixed solution was added to 1700 g of water glass solution having a concentration of 5 wt % (based on SiO$_2$), and then heated to 80° C. and aged for 4 h Ammonium ion exchange was conducted according to the method in Example 1 to obtain a mesopore material in a gel state, which was abbreviated to be N2. N2 was then dried at 120° C. for 15 h, and calcined at 600° C. for 3 h to obtain the mesopore material, which was abbreviated to be G2. The element analysis weight chemical formula of such sample is 0.1Na$_2$O.5.1CaO.9.8Al$_2$O$_3$.85.0SiO$_2$, and the physicochemical parameters thereof, such as specific surface, pore volume and the like, are listed in Table 1.

Example 3

This example shows the mesopore material in the catalyst provided in the present invention, as well as the process for preparing the same.

500 g of magnesium sulfate solution having a concentration of 4 wt % (based on MgO) was added to a beaker. Under the stirring condition, 1300 g of water glass solution having a concentration of 5 wt % (based on SiO$_2$) was added to the aforesaid magnesium sulfate solution, and 500 g of sodium aluminate solution having a concentration of 3 wt % (based on Al$_2$O$_3$) was further added therein. The aforesaid mixed solution was then heated to 80° C. and aged for 4 h Ammonium ion exchange was conducted according to the method in Example 1 to obtain a mesopore material in a gel state, which was abbreviated to be N3. N3 was then dried at 120° C. for 15 h, and calcined at 600° C. for 3 h to obtain the mesopore material, which was abbreviated to be G3. The element analysis weight chemical formula of such sample is 0.1Na$_2$O.21.5MgO.12.3Al$_2$O$_3$.66.1SiO$_2$, and the physicochemical parameters thereof, such as specific surface, pore volume and the like, are listed in Table 1.

Example 4

This example shows the mesopore material in the catalyst provided in the present invention, as well as the process for preparing the same.

1210 g of water glass solution having a concentration of 5 wt % (based on SiO$_2$) was added to a beaker. Under the stirring condition, 400 g of sodium aluminate solution having a concentration of 5 wt % (based on Al$_2$O$_3$), 300 g of aluminium sulfate solution having a concentration of 5 wt % (based on Al$_2$O$_3$) and 450 g of barium nitrate solution having a concentration of 1 wt % (based on BaO) were added to the aforesaid water glass solution, and heated to 80° C. and aged for 4 h. Ammonium ion exchange was conducted according to the method in Example 1 to obtain a mesopore material in a gel state, which was abbreviated to be N4. N4 was then dried at 120° C. for 15 h, and calcined at 600° C. for 3 h to obtain the mesopore material, which was abbreviated to be G4. The element analysis weight chemical formula of such sample is 0.1Na$_2$O.4.5BaO.34.8Al$_2$O$_3$.60.6SiO$_2$, and the physicochemical parameters thereof, such as specific surface, pore volume and the like, are listed in Table 1.

Example 5

This example shows the mesopore material in the catalyst provided in the present invention, as well as the process for preparing the same.

750 g of magnesium sulfate solution having a concentration of 4 wt % (based on MgO) was added to a beaker. Under the stirring condition, 1600 g of water glass solution having a concentration of 4 wt % (based on SiO$_2$) was added to the aforesaid magnesium sulfate solution, and 150 g of sodium aluminate solution having a concentration of 4 wt % (based on Al$_2$O$_3$) was further added therein. The aforesaid mixed solution was then heated to 80° C. and aged for 4 h Ammonium ion exchange was conducted according to the method in Example 1 to obtain a mesopore material in a gel state, which was abbreviated to be N5. N5 was then dried at 120° C. for 15 h, and calcined at 600° C. for 3 h to obtain the conversion catalyst containing 100 wt % of the mesopore material, which was abbreviated to be G5. The element analysis weight chemical formula of such sample is 0.1Na$_2$O.29.8MgO.6.2Al$_2$O$_3$.63.9SiO$_2$, and the physicochemical parameters thereof, such as specific surface, pore volume and the like, are listed in Table 1.

Example 6

This example shows the mesopore material in the catalyst provided in the present invention, as well as the process for preparing the same.

300 g of barium nitrate solution having a concentration of 1 wt % (based on BaO) was added to 200 g of aluminium sulfate solution having a concentration of 3 wt % (based on Al$_2$O$_3$). Under the stirring condition, the aforesaid mixed solution was added to 1800 g of water glass solution having a concentration of 5 wt % (based on SiO$_2$), and then heated to 80° C. and aged for 4 h Ammonium ion exchange was conducted according to the method in Example 1 to obtain a mesopore material in a gel state, which was abbreviated to be N6. N6 was then dried at 120° C. for 15 h, and calcined at 600° C. for 3 h to obtain the mesopore material, which was abbreviated to be G6. The element analysis weight chemical formula of such sample is 0.1Na$_2$O.3.1BaO.6.1Al$_2$O$_3$.90.7SiO$_2$, and the physicochemical parameters thereof, such as specific surface, pore volume and the like, are listed in Table 1.

TABLE 1

| Samples | Specific surface area, m2/g | Pore volume, ml/g | Average pore diameter, nm | Most probable pore size, nm |
|---|---|---|---|---|
| G1 | 342 | 1.09 | 11.8 | 10 |
| G2 | 325 | 1.16 | 13.5 | 12 |
| G3 | 380 | 1.01 | 12.5 | 11 |

TABLE 1-continued

| Samples | Specific surface area, m2/g | Pore volume, ml/g | Average pore diameter, nm | Most probable pore size, nm |
|---|---|---|---|---|
| G4 | 394 | 0.64 | 8.5 | 7 |
| G5 | 281 | 1.07 | 14.2 | 13 |
| G6 | 237 | 1.35 | 15.8 | 14 |

Example 7

This example shows the catalyst provided in the present invention, as well as the process for preparing the same.

1.7 L of hydrochloric acid was diluted with 8.0 Kg of decationized water.

7.7 kg of sodium water glass was diluted with 8.0 Kg of decationized water. Under the stirring condition, the diluted sodium water glass was slowly added to the aforesaid dilute hydrochloric acid solution, to obtain a silica sol having a $SiO_2$ concentration of 7.8 wt % and a pH of 2.8.

3.4 Kg of halloysite was added to the aforesaid silica sol, and stirred for 1 h to disperse kaolin sufficiently.

3.8 Kg of DASY molecular sieves, 2.0 Kg (dry basis) of the mesopore material G1 prepared according to Example 1 were added to 12.5 Kg of decationized water. Then the solution was sufficiently dispersed with a homogenizer, and adjusted to a pH of 3.5 with dilute hydrochloric acid. The mixed slurry of the molecular sieves and the mesopore material was added to the aforesaid silica sol-clay slurry and stirred for 0.5 h, to obtain a catalyst slurry having a solid content of 20.8 wt % and a pH of 2.9. Such slurry was spray-dried at 250° C., washed, dried and calcined to obtain a catalyst consisting of 20 wt % of the mesopore material, 35 wt % of DASY molecular sieves, 25 wt % of kaolin and 20 wt % of $SiO_2$ binder, which was abbreviated to be C1.

Comparative Example 1

This comparative example shows the comparative catalyst containing no mesopore material and the process for preparing the same.

A catalyst was prepared according to the process of Example 7. The difference lay in adding no mesopore material, and adding 6.1 Kg of halloysite, to obtain a comparative catalyst containing 35 wt % of DASY mesopore material, 45 wt % of kaolin and 20 wt % of $SiO_2$ binder, which was abbreviated to be CB1.

Comparative Example 2

This comparative example shows the comparative catalyst of $V_2O_5$-containing mesopore material and the process for preparing the same.

A mesopore material was prepared according to the process of Example 1. The difference lay in replacing calcium chloride with vanadium oxalate, to obtain a vanadium-containing mesopore material, which was abbreviated to be GB 1. The element analysis weight chemical composition of such sample is $0.2Na_2O.9.8V_2O_5.19.8Al_2O_3.70.2SiO_2$.

A catalyst was prepared according to the process of Example 7. The difference lay in replacing G1 with a vanadium-containing mesopore material GB1, to obtain a comparative catalyst containing 20 wt % of a vanadium-containing mesopore material, 35 wt % of DASY mesopore material, 25 wt % of kaolin and 20 wt % of $SiO_2$ binder, which was abbreviated to be CB2.

Comparative Example 3

This comparative example shows the comparative catalyst of $TiO_2$-containing mesopore material and the process for preparing the same.

A mesopore material was prepared according to the process of Example 1. The difference lay in replacing calcium chloride with titanium tetrachloride, to obtain a titanium-containing mesopore material, which was abbreviated to be GB2. The element analysis weight chemical composition of such sample is $0.2Na_2O.9.8TiO_2.19.8Al_2O_3.70.2SiO_2$.

A catalyst was prepared according to the process of Example 7. The difference lay in replacing G1 with a vanadium-containing mesopore material GB2, to obtain a comparative catalyst containing 20 wt % of a titanium-containing mesopore material, 35 wt % of DASY mesopore material, 25 wt % of kaolin and 20 wt % of $SiO_2$ binder, which was abbreviated to be CB3.

Example 8

This example shows the catalyst provided in the present invention, as well as the process for preparing the same.

2.7 Kg of halloysite was added to 15 Kg of decationized water and slurried. 3.2 Kg of pseudo-boehmite was added therein, and hydrochloric acid was used to adjust the pH thereof to 2. After homogeneous stirring, the mixture was kept at 70° C. and aged for 1 h. Then 2.3 Kg of alumina sol was added and homogeneously stirred, and the precursor of the thermotolerant inorganic oxides added before and after aging step enabled the weight ratio of the thermotolerant inorganic oxides added before and after aging step to be 1:0.25.

2.0 Kg of DASY molecular sieves, 0.72 Kg of ZSP-2 molecular sieves, 3.0 Kg (dry basis) of the mesopore material G2 prepared according to Example 2 were added to 12.5 Kg of decationized water. Then the solution was sufficiently dispersed with a homogenizer, and adjusted to a pH of 3.5 with dilute hydrochloric acid. The mixed slurry of the molecular sieves and the mesopore material was added to the aforesaid alumina-clay slurry and stirred for 0.5 h, to obtain a catalyst slurry having a solid content of 24.0 wt %. Such slurry was spray-dried at 250° C., washed, dried and calcined to obtain a catalyst consisting of 30 wt % of the mesopore material, 18 wt % of DASY molecular sieves, 7 wt % of ZSP-2 molecular sieves, 20 wt % of kaolin and 25 wt % of $Al_2O_3$ binder, which was abbreviated to be C2.

Example 9

This example shows the catalyst provided in the present invention, as well as the process for preparing the same.

3.4 Kg of halloysite was added to 15 Kg of decationized water and slurried. 3.2 Kg of pseudo-boehmite was added therein, and hydrochloric acid was used to adjust the pH thereof to 2. After homogeneous stirring, the mixture was kept at 70° C. and aged for 1 h. Then 4.7 Kg of aluminium sol was added and homogeneously stirred, and the precursor of the thermotolerant inorganic oxides added before and after aging step enabled the weight ratio of the thermotolerant inorganic oxides added before and after aging step to be 1:0.5.

1.1 Kg of DASY molecular sieves and 2.1 Kg of ZSP-2 molecular sieves were added to 6.0 Kg of decationized water. Then the solution was sufficiently dispersed with a homogenizer. The molecular sieve slurry was added to the aforesaid alumina-clay slurry. 1.5 Kg (dry basis) of the mesopore material N2 in a gel state prepared according to Example 2 was added and stirred for 0.5 h, to obtain a catalyst slurry having a solid content of 21.2 wt %. Such slurry was spray-dried at 250° C., washed, dried and calcined to obtain a catalyst consisting of 15 wt % of the mesopore material, 10 wt % of DASY molecular sieves, 20 wt % of ZSP-2 molecular sieves, 25 wt % of kaolin and 30 wt % of $Al_2O_3$ binder, which was abbreviated to be C3.

Example 10

This example shows the catalyst provided in the present invention, as well as the process for preparing the same.

4.1 Kg of halloysite was added to 20 Kg of decationized water and slurried. 4.8 Kg of pseudo-boehmite was added therein, and hydrochloric acid was used to adjust the pH thereof to 2. After homogeneous stirring, the mixture was kept at 70° C. and aged for 1 h.

2.3 Kg of REHY molecular sieves, 1.1 Kg of Beta molecular sieves and 1.0 Kg (dry basis) of the mesopore material G3 prepared according to Example 3 were added to 7.5 Kg of decationized water. Then the solution was sufficiently dispersed with a homogenizer, and adjusted to a pH of 3.5 with dilute hydrochloric acid. The molecular sieve slurry was added to the aforesaid alumina-clay slurry, and stirred for 0.5 h, to obtain a catalyst slurry having a solid content of 24.3 wt %. Such slurry was spray-dried at 250° C., washed, dried and calcined to obtain a catalyst consisting of 10 wt % of the mesopore material, 20 wt % of REHY molecular sieves, 10 wt % of Beta molecular sieves, 30 wt % of kaolin and 30 wt % of $Al_2O_3$ binder, which was abbreviated to be C4.

Example 11

This example shows the catalyst provided in the present invention, as well as the process for preparing the same.

3.2 Kg of DOSY molecular sieves was added to 6.0 Kg of decationized water. Then the solution was sufficiently dispersed with a homogenizer. 4.0 Kg (dry basis) of the mesopore material N3 in a gel state prepared according to Example 3 and 14.0 Kg of alumina sol were added and homogeneously stirred, to obtain a catalyst slurry having a solid content of 17.8 wt %. Such slurry was spray-dried at 250° C., washed, dried and calcined to obtain a catalyst consisting of 40 wt % of the mesopore material, 30 wt % of DOSY molecular sieves and 30 wt % of $Al_2O_3$ binder, which was abbreviated to be C5.

Example 12

This example shows the catalyst provided in the present invention, as well as the process for preparing the same.

4.1 Kg of halloysite was added to 20 Kg of decationized water and slurried. 4.0 Kg of pseudo-boehmite was added therein, and hydrochloric acid was used to adjust the pH thereof to 2. After homogeneous stirring, the mixture was kept at 70° C. and aged for 1 h.

2.2 Kg of DASY molecular sieves and 2.5 Kg (dry basis) of the mesopore material G4 prepared according to Example 4 were added to 8.0 Kg of decationized water. Then the solution was sufficiently dispersed with a homogenizer, and adjusted to a pH of 3.5 with dilute hydrochloric acid. The mixed slurry of the molecular sieve and the mesopore material was added to the aforesaid alumina-clay slurry, and stirred for 0.5 h, to obtain a catalyst slurry having a solid content of 24.2 wt %. Such slurry was spray-dried at 250° C., washed, dried and calcined to obtain a catalyst consisting of 25 wt % of the mesopore material, 20 wt % of DASY molecular sieves, 30 wt % of kaolin and 25 wt % of $Al_2O_3$ binder, which was abbreviated to be C6.

Example 13

This example shows the catalyst provided in the present invention, as well as the process for preparing the same.

A catalyst was prepared according to the process of Example 12. The difference lay in replacing G4 with the mesopore material G5 prepared according to Example 5, to obtain a catalyst consisting of 25 wt % of the mesopore material, 20 wt % of DASY molecular sieves, 30 wt % of kaolin and 25 wt % of $Al_2O_3$ binder, which was abbreviated to be C7.

Example 14

This example shows the catalyst provided in the present invention, as well as the process for preparing the same.

A catalyst was prepared according to the process of Example 12. The difference lay in replacing G4 with the mesopore material G6 prepared according to Example 6, to obtain a catalyst consisting of 25 wt % of the mesopore material, 20 wt % of DASY molecular sieves, 30 wt % of kaolin and 25 wt % of $Al_2O_3$ binder, which was abbreviated to be C8.

Example 15

This example shows the catalytic performance of the catalyst provided in the present invention.

The catalyst C1 was metal-contaminated, wherein the contaminant amounts were respectively Fe:6000 ppm, Ni:9000 ppm, and Ca:3000 ppm. Then the contaminated catalyst was aged with 100% steam for 8 h.

In the small-scale fixed fluidized bed apparatus, the cracking performance of the catalyst was reviewed by using inferior acid-containing crude oil 2 as shown in Table 2, wherein the reaction temperature was 500° C.; the catalyst/oil weight ratio was 5; and the weight hourly space velocity was 20 $h^{-1}$. The reaction conditions and results can be found in Table 3.

Comparative Examples 4-6

The following comparative examples show the catalytic performance of the comparative catalyst.

Contamination and aging was conducted according to the process of Example 15, and the catalytic performance of the catalyst was evaluated. The difference thereof lay in replacing the catalyst C1 provided in the present invention with the comparative catalysts CB1, CB2 and CB3 in Comparative Examples 1-3 respectively. The reaction conditions and results can be found in Table 3.

Examples 16-17

The following examples show the catalytic performance of the catalyst provided in the present invention.

The catalysts C2 and C3 were aged with 100% steam for 17 h. In the small-scale fixed fluidized bed apparatus, the cracking performance of the catalyst was reviewed by using inferior acid-containing crude oil 1 as shown in Table 2. The reaction conditions and product distribution can be found in Table 4.

Examples 18-19

The following examples show the catalytic performance of the catalyst provided in the present invention.

The catalysts C4 and C5 were respectively metal-contaminated, wherein the contaminant amounts were respectively Fe:8000 ppm, Ni:12000 ppm, and Ca:4000 ppm. The contaminated conversion catalysts were aged with 100% steam for 8 h. In the small-scale fixed fluidized bed apparatus, the cracking performance of the catalyst was reviewed by using inferior acid-containing crude oil 3 as shown in Table 2, wherein the reaction temperature was 500° C.; the catalyst/oil weight ratio was 6; and the weight hourly space velocity was 20 $h^{-1}$. The reaction conditions and results can be found in Table 5.

Examples 20-22

The following examples show the catalytic performance of the catalyst provided in the present invention.

The catalysts C6, C7 and C8 were respectively metal-contaminated, wherein the contaminant amounts were respectively Fe:6000 ppm, Ni:9000 ppm, and Ca:3000 ppm. The contaminated conversion catalysts were aged with 100% steam for 8 h. In the small-scale fixed fluidized bed apparatus, the cracking performance of the catalyst was reviewed by using inferior acid-containing crude oil 4 as shown in Table 2, wherein the reaction temperature was 520° C.; the catalyst/oil weight ratio was 8; and the weight hourly space velocity was 16 $h^{-1}$. The reaction conditions and results can be found in Table 6.

TABLE 3

| | Example No. | | | |
|---|---|---|---|---|
| | Example 15 | Comp. Example 4 | Comp. Example 5 | Comp. Example 6 |
| Catalyst | C1 | CB1 | CB2 | CB3 |
| Reaction temperature, ° C. | 500 | 500 | 500 | 500 |
| Weight ratio of catalyst/oil | 5 | 5 | 5 | 5 |
| weight hourly space velocity, $h^{-1}$ | 20 | 20 | 20 | 20 |
| Conversion, wt % | 74.3 | 67.5 | 71.8 | 73.4 |
| Product distribution, wt % | | | | |
| Dry gas | 1.4 | 1.1 | 1.3 | 1.4 |
| LPG | 14.9 | 11.1 | 13.8 | 14.5 |
| Gasoline | 43.4 | 41.7 | 42.6 | 43.2 |
| Diesel oil | 18.3 | 20.2 | 19.0 | 18.7 |
| Heavy oil | 7.4 | 12.3 | 9.2 | 7.9 |
| coke | 14.6 | 13.6 | 14.1 | 14.3 |
| Acidity of gasoline, mgKOH/100 ml | 0.1 | 0.4 | 0.4 | 0.4 |
| Acid number of diesel oil, mgKOH/g | <0.02 | <0.02 | <0.02 | <0.02 |

TABLE 2

| Properties of crude oils | | | | |
|---|---|---|---|---|
| Name of crude oil | Crude oil 1 | Crude oil 2 | Crude oil 3 | Crude oil 4 |
| Density (20° C.), g/cm$^3$ | 0.9334 | 0.9385 | 0.9028 | 0.9344 |
| Kinematic viscosity, mm$^2$/s (80° C.) | 30.9 | 26.18 | 24.6 | 23.87 |
| Kinematic viscosity, mm$^2$/s (100° C.) | 15.2 | 14.30 | 12.4 | 11.8 |
| Total acid number, mgKOH/g | 2.8 | 3.7 | 4.3 | 0.8 |
| Pour point, ° C. | −10 | −33 | −12 | −39 |
| Refractive index, $n_D^{70}$ | 1.495 | 1.5107 | 1.4945 | 1.5278 |
| Conradson carbon residue, wt % | 6.2 | 7.4 | 6.8 | 7.2 |
| Average molecular weight | 387 | 389 | 392 | 408 |
| Four components, wt % | | | | |
| Saturated hydrocarbon | 50.1 | 44.4 | 40.2 | 44.6 |
| Aromatic | 32.2 | 24.3 | 30.6 | 35.6 |
| Resin | 16.6 | 31.2 | 29.1 | 16.8 |
| Asphaltene | 0.1 | 0.1 | 0.1 | 3.0 |
| Element composition, wt % | | | | |
| C | 87.11 | 87.07 | 87.21 | 86.53 |
| H | 12.3 | 11.83 | 12.2 | 11.64 |
| S | 0.3 | 0.45 | 0.4 | 0.41 |
| N | 0.3 | 0.25 | 0.3 | 0.75 |
| Metal content, μg/g | | | | |
| Fe | 47.6 | 11.5 | 50.6 | 5.8 |
| Ni | 14.9 | 27.0 | 20.1 | 24.5 |
| Ca | 45.3 | 75.8 | 55.4 | 13.8 |
| V | 15.5 | 0.6 | 2.1 | 30.3 |
| Na | 1.2 | 2.7 | 1.2 | 6.3 |
| Distillation range, wt % | | | | |
| 15~200° C. | 7.51 | 6.31 | 5.31 | 8.63 |
| 200~350° C. | 24.55 | 21.88 | 20.75 | 19.10 |
| 350~500° C. | 32.44 | 32.70 | 33.22 | 23.79 |
| >500° C. | 35.5 | 39.11 | 38.7 | 48.48 |

TABLE 4

| Example No. | Example 16 | Example 17 |
|---|---|---|
| Catalyst | C2 | C3 |
| Reaction temperature, ° C. | 520 | 560 |
| Weight ratio of catalyst/oil | 10 | 10 |
| weight hourly space velocity, $h^{-1}$ | 10 | 15 |
| Water/oil ratio, wt % | 12.5 | 25 |
| Conversion, wt % | 77.6 | 85.4 |
| Product distribution, wt % | | |
| Dry gas | 5.4 | 10.1 |
| LPG | 21.2 | 39.3 |
| Gasoline | 41.4 | 24.8 |
| Diesel oil | 16.0 | 10.4 |
| Heavy oil | 6.4 | 4.2 |
| coke | 9.6 | 11.2 |
| Light olefins, wt % | | |
| Ethylene | 1.2 | 5.1 |
| Propylene | 6.3 | 16.5 |
| Butylene | 7.2 | 12.4 |
| Acidity of gasoline, mgKOH/100 ml | 0.1 | 0.1 |
| Acid number of diesel oil, mgKOH/g | <0.02 | <0.02 |

TABLE 5

| Example No. | Example 18 | Example 19 |
|---|---|---|
| Catalyst | C4 | C5 |
| Reaction temperature, ° C. | 500 | 500 |
| Weight ratio of catalyst/oil | 6 | 6 |
| Weight hourly space velocity, $h^{-1}$ | 20 | 20 |
| Conversion, wt % | 67.3 | 69.1 |
| Product distribution, wt % | | |
| Dry gas | 1.2 | 1.1 |
| LPG | 13.9 | 13.2 |
| Gasoline | 40.7 | 43.9 |
| Diesel oil | 19.9 | 19.8 |
| Heavy oil | 12.8 | 11.1 |
| coke | 11.5 | 10.9 |
| Acidity of gasoline, mgKOH/100 ml | 0.1 | 0.1 |
| Acid number of diesel oil, mgKOH/g | <0.02 | <0.02 |

TABLE 6

| Example No. | Example 20 | Example 21 | Example 22 |
|---|---|---|---|
| Catalyst | C6 | C7 | C8 |
| Reaction temperature, ° C. | 520 | 520 | 520 |
| Weight ratio of catalyst/oil | 8 | 8 | 8 |
| Weight hourly space velocity, $h^{-1}$ | 16 | 16 | 16 |
| Conversion, wt % | 69.6 | 68.8 | 69.2 |
| Product distribution, wt % | | | |
| Dry gas | 1.8 | 1.7 | 1.6 |
| LPG | 15.6 | 15.3 | 15.5 |
| Gasoline | 41.4 | 41.2 | 41.6 |
| Diesel oil | 16.9 | 16.8 | 17.1 |
| Heavy oil | 13.5 | 14.4 | 13.7 |
| coke | 10.8 | 10.6 | 10.5 |
| Acidity of gasoline, mgKOH/100 ml | 0.1 | 0.1 | 0.1 |
| Acid number of diesel oil, mgKOH/g | <0.02 | <0.02 | <0.02 |

According to Tables 3, 4, 5 and 6, it can be seen that the catalyst provided in the present invention can be directly used to catalytically crack inferior acid-containing crude oil having a total acid number of greater than 0.8 mgKOH/g, a resin content of greater than 16.6 wt % and a high metal content, so as to directly produce high added-value products. Meanwhile, the acid number or acidity of the reaction products, such as gasoline, diesel oil and the like, satisfies the product requirements without the necessity of refining the products due to high acid number or acidity. Thus the catalyst has very good economic benefits.

The invention claimed is:

1. A catalyst for converting inferior acid-containing crude oil, characterized in that, based on the total amount of the catalyst, said catalyst comprises from 1 to 50 wt % of a mesopore material, from 1 to 60 wt % of molecular sieves and from 5 to 98 wt % of thermotolerant inorganic oxides and from 0 to 70 wt % of clays; said mesopore material is an amorphous material containing alkaline earth oxide, silica and alumina, and has an anhydrous chemical formula of $(0-0.2)Na_2O \cdot (2-30)MO \cdot (6-35) Al_2O_3 \cdot (60-92)SiO_2$, based on the weight percent of the oxides, wherein M is one or more selected from Mg, Ca and Ba; said mesopore material has a specific surface area of 200-400 $m^2/g$, a pore volume of 0.5-2.0 ml/g, and an average pore diameter of 8-20 nm.

2. The catalyst according to claim 1, characterized in that said alkaline earth metal M is selected from the group consisting of Mg and Ca.

3. The catalyst according to claim 1, characterized in that said catalyst comprises from 5 to 40 wt % of the mesopore material, from 10 to 50 wt % of the molecular sieves, from 10 to 70 wt % of the thermotolerant inorganic oxides, and from 0 to 60 wt % of the clays, based on the total amount of the catalyst.

4. The catalyst according to claim 3, characterized in that said catalyst comprises from 10 to 40 wt % of the mesopore material and from 20 to 40 wt % of the molecular sieves, based on the total amount of the catalyst.

5. The catalyst according to claim 1, characterized in that said molecular sieve is one or the mixture of more selected from the group consisting of faujasite, Beta zeolite, molecular sieves having MFI structure and mordenite.

6. The catalyst according to claim 1, characterized in that said thermotolerant inorganic oxide is one or the mixture of more selected from the group consisting of alumina, silica and amorphous silica-alumina; and said clay is one or the mixture of more selected from kaolin, halloysite, montmorillonite, diatomite, endellite, saponite, rectorite, sepiolite, attapulgite, hydrotalcite and bentonite.

7. A process for preparing the catalyst according to claim 1, characterized in that said process comprises mixing and slurrying all or a portion of thermotolerant inorganic oxides and/or the precursor thereof and water, adding or not adding clays, adding the mesopore material, adding the molecular sieves, drying the obtained slurry and calcining, wherein an acid is added before adding the mesopore material, before or after adding the clays, to adjust the pH the slurry to 1-5, and the slurry is aged at a temperature of 30-90° C. for 0.1-10 h, adding the residual thermotolerant inorganic oxides and/or the precursor thereof after aging step, wherein the amount of each component enables the final catalyst to comprise from 1 to 50 wt % of the mesopore material, from 1 to 60 wt % of the molecular sieves, from 5 to 98 wt % of thermotolerant inorganic oxides and from 0 to 70 wt % of the clays, based on the total amount of the catalyst.

8. The process according to claim 7, characterized in that a portion of thermotolerant inorganic oxides and/or the precursor thereof are/is added before aging step, and the residual thermotolerant inorganic oxides and/or the precursor thereof are/is added after aging step, wherein the portion added firstly and the portion added later enables the weight ratio of the thermotolerant inorganic oxides added firstly and the thermotolerant inorganic oxides added later to be 1:0.1-10 in catalyst.

9. A process for catalytically converting inferior acid-containing crude oil using the catalytically conversion catalyst according to claim 1, comprising pretreating and preheating said crude oil, introducing into the catalytic cracker, contacting with the catalyst according to claim 1 and reacting under the catalytically cracking reaction conditions, separating the reacted oil and gas and the coked catalyst, wherein the reacted gas and oil is fed into the subsequent separation system; and the catalyst is recycled after stripping and regenerating.

10. The process according to claim 9, characterized in that said pretreated crude oil is preheated to 100-250° C., and fed into the catalytic cracker to come into contact with said catalyst and react under the catalytically cracking reaction conditions.

11. The process according to claim 10, characterized in preheating said pretreated crude oil having a total acid number of greater than 0.5 mgKOH/g and a characteristic factor K value of less than 12.5, and introducing into the catalytic cracker, contacting with the catalyst and reacting under the catalytically cracking reaction conditions, separating the reacted oil and gas and the coked catalyst, wherein the reacted gas and oil is fed into the separation system to produce the products having different distillation ranges, and all or a portion of diesel oil are introduced back to the reaction system for further reaction; and the catalyst is recycled after stripping and regenerating.

12. The process according to claim 10, characterized in preheating said pretreated crude oil having a total acid number of greater than 0.5 mgKOH/g and a characteristic factor K value of greater than 12.1, and introducing into the catalytic cracker, contacting with the catalyst and reacting under the catalytically cracking reaction conditions, separating the reacted oil and gas and the coked catalyst, wherein the reacted gas and oil is fed into the separation system to produce the products having different distillation ranges; and the catalyst is recycled after stripping and regenerating; the molecular sieves in said catalyst comprises Y-type molecular sieves, molecular sieves having MFI structure and optionally Beta molecular sieves, wherein said Y-type molecular sieves are in an amount of from 10 to 80 wt %; said molecular sieves having MFI structure are in an amount of from 10 to 90 wt %, and said Beta molecular sieves are in an amount of from 0 to 25 wt %, based on the total amount of the molecular sieves.

13. The process according to claim 9, characterized in that said catalytic cracking is conducted at a reaction temperature of 450-650° C., a reaction pressure of 0.1-0.8 Mpa, a weight hourly space velocity of 5-25 h$^{-1}$, and a mass ratio of 1-30 of the catalyst to said crude oil.

14. The process according to claim 13, characterized in that said catalytic cracking is conducted at a reaction temperature of 480-600° C., an absolute pressure of 0.1-0.5 Mpa in the reaction region, a weight hourly space velocity of 10-20 h$^{-1}$, and a mass ratio of 3-15 of the catalyst to said crude oil.

15. The process according to claim 10, characterized in that said crude oil has a total acid number of greater than 1.0 mgKOH/g, a total content of heavy metals nickel and vanadium of greater than 10 ppm, a sulfur content of greater than 1000 ppm, and a conradson carbon number of greater than 5 wt %.

16. The process according to claim 11, characterized in that said crude oil has a total acid number of greater than 1.0 mgKOH/g, a total content of heavy metals nickel and vanadium of greater than 10 ppm, a sulfur content of greater than 1000 ppm, and a conradson carbon number of greater than 5 wt %.

17. The process according to claim 12, characterized in that said crude oil has a total acid number of greater than 1.0 mgKOH/g, a total content of heavy metals nickel and vanadium of greater than 10 ppm, a sulfur content of greater than 1000 ppm, and a conradson carbon number of greater than 5 wt %.

* * * * *